US009185140B2

(12) United States Patent
Nemani et al.

(10) Patent No.: US 9,185,140 B2
(45) Date of Patent: Nov. 10, 2015

(54) RECONSTRUCTION OF SESSION INITIATION PROTOCOL (SIP) DIALOGS IN A SIP NETWORK

(71) Applicant: Avaya Inc., Basking Ridge, NJ (US)

(72) Inventors: Sreekanth Subrahmanya Nemani, Pune (IN); Mohan Vinayak Phadnis, Viman Nagar (IN)

(73) Assignee: Avaya Inc., Basking Ridge, NJ (US)

( * ) Notice: Subject to any disclaimer, the term of this patent is extended or adjusted under 35 U.S.C. 154(b) by 461 days.

(21) Appl. No.: 13/752,981

(22) Filed: Jan. 29, 2013

(65) Prior Publication Data

US 2014/0214972 A1    Jul. 31, 2014

(51) Int. Cl.
| | |
|---|---|
| H04L 29/08 | (2006.01) |
| H04L 29/06 | (2006.01) |
| H04L 29/00 | (2006.01) |
| H04W 76/02 | (2009.01) |
| H04W 76/00 | (2009.01) |

(52) U.S. Cl.
CPC ...... *H04L 65/1006* (2013.01); *H04L 29/06176* (2013.01); *H04L 29/06197* (2013.01); *H04L 29/06319* (2013.01); *H04L 29/08576* (2013.01); *H04L 29/08594* (2013.01); *H04L 65/105* (2013.01); *H04L 65/1069* (2013.01); *H04W 76/028* (2013.01); *H04L 29/00* (2013.01); *H04W 76/00* (2013.01)

(58) Field of Classification Search
CPC .............. H04L 29/00; H04L 29/06197; H04L 29/06176; H04L 29/06319; H04L 29/08576; H04L 29/08594; H04W 76/00; H04W 76/028
See application file for complete search history.

(56) References Cited

U.S. PATENT DOCUMENTS

| | | | | |
|---|---|---|---|---|
| 7,995,559 | B2* | 8/2011 | Bao et al. | 370/352 |
| 8,135,394 | B1* | 3/2012 | Shrum et al. | 455/421 |
| 8,250,217 | B2* | 8/2012 | Kidachi et al. | 709/227 |
| 8,359,024 | B1* | 1/2013 | Singh et al. | 455/423 |
| 8,908,835 | B1* | 12/2014 | Robbins | 379/45 |
| 2007/0291106 | A1* | 12/2007 | Kenrick et al. | 348/14.01 |
| 2009/0034495 | A1* | 2/2009 | Khijniak et al. | 370/338 |
| 2009/0310595 | A1* | 12/2009 | Badger | 370/352 |
| 2011/0122863 | A1 | 5/2011 | Balasaygun et al. | |
| 2012/0259925 | A1* | 10/2012 | Braudes | 709/206 |
| 2013/0055016 | A1* | 2/2013 | Charles et al. | 714/15 |
| 2014/0047122 | A1* | 2/2014 | Haserodt et al. | 709/228 |

\* cited by examiner

*Primary Examiner* — Patrice Winder
*Assistant Examiner* — Angela Widhalm
(74) *Attorney, Agent, or Firm* — Sheridan Ross P.C.

(57) ABSTRACT

A Session Initiation Protocol (SIP) session dialog is established between a first user agent and a second user agent. The SIP server receives an in-dialog message for the SIP session dialog. At this point, the SIP server is no longer aware of the SIP session dialog, for example, because the SIP server was rebooted. In response to receiving the in-dialog message, the SIP server sends a request not found message to the first user agent that comprises a server accessible value. The SIP server receives an out-of-dialog SIP REFER message. The out-of-dialog SIP REFER message comprises call state information for the SIP session dialog and is sent based on the server accessible value. The SIP server sends the out-of-dialog SIP REFER message to the second user agent. The SIP session dialog is reestablished. The SIP server can be a SIP proxy server or a Back-to-Back User Agent.

20 Claims, 6 Drawing Sheets

RECONSTRUCTION OF SESSION INITIATION PROTOCOL (SIP) DIALOGS IN A SIP NETWORK

TECHNICAL FIELD

The systems and methods relate to reconstructing a communication session and in particular to reconstruction of Session Initiation Protocol (SIP) dialogs.

BACKGROUND

In the Session Initiation Protocol (SIP), a dialog for a communication is setup for different kinds of communications sessions, such as voice, video, text, and the like. The initial signaling to establish the dialog for the communication session is typically setup using a SIP proxy server and/or a Back-to-Back User Agent (B2BUA). Once the communication session is setup using the SIP Proxy server and/or the B2BUA, a media session may be created directly between user agents in SIP devices. For example, a SIP proxy server can setup an initial voice call between two SIP devices. Once the initial voice call is established by the proxy server, the communication session voice call can be setup (e.g., using Real-Time Protocol (RTP)) directly between the two communication devices.

This call setup model creates some problems if the SIP Proxy server in the above example fails during the communication session. For example, if a user of a SIP device involved in the communication session wants to transfer a voice call, the user of the SIP device will be unable to transfer the voice call even if the SIP proxy server has been reinitialized or failed over to a new SIP proxy server. This is because the reinitialized/new SIP proxy server is unaware of the previous voice call.

SUMMARY

Systems and methods are provided to solve these and other problems and disadvantages of the prior art. A Session Initiation Protocol (SIP) session dialog is established, using a processor enabled SIP server, between a first user agent and a second user agent. The SIP server receives, from the first user agent, an in-dialog message for the SIP session dialog between the first user agent and the second user agent. The SIP server is no longer aware of the SIP session dialog. For example, the SIP server may no longer be aware of the SIP session dialog because the SIP server was rebooted. In response to receiving the in-dialog message for the SIP session dialog between the first user agent and the second user agent, the SIP server sends a request not found message to the first user agent. The request not found message comprises a server accessible value. The SIP server receives, from the first user agent, an out-of-dialog SIP REFER message for the second user agent. The out-of-dialog SIP REFER message comprises call state information for the SIP session dialog between the first user agent and the second user agent and the out-of-dialog SIP REFER message is sent based on the server accessible value. The SIP server sends the out-of-dialog SIP REFER message to the second user agent. The SIP session dialog is reestablished between the first user agent and the second user agent.

In an embodiment, the SIP server is a SIP proxy server. A media session is established directly between the first user agent and the second user agent.

In an embodiment, the SIP server is a Back-to-Back User Agent (B2BUA). The B2BUA sends, to the second user agent, a SIP OPTIONS query message comprising a request for call-state information for a SIP dialog between the B2BUA and the second user agent. In response to the SIP OPTIONS query message, the B2BUA receives from the second user agent a 200 OK message that includes the call state information for the SIP dialog between the B2BUA and the second user agent.

In an embodiment, reestablishing the SIP session dialog between the first user agent and the second user agent comprises reestablishing the SIP dialog between the B2BUA and the second user agent and reestablishing a SIP dialog between the B2BUA and the first user agent.

In an embodiment, the second user agent sends the 200 OK message that includes the call state information for the SIP dialog between the B2BUA and the second user agent if a match among active calls is found in the second user agent.

In an embodiment, the call state information for the SIP dialog between the B2BUA and the second user agent comprises a session ID for the SIP session dialog between the first user agent and the second user agent. The B2BUA uses the session ID for the SIP session dialog to reestablish the SIP session dialog between the first user agent and the second user agent.

In an embodiment, the call state information for the SIP dialog between the B2BUA and the second user agent does not include a session ID for the SIP session dialog between the first user agent and the second user agent. The call state information for the SIP dialog between the B2BUA and the second user agent comprises a To field and a From field. The To field and the From field are used to reestablish the SIP session dialog between the first user agent and the second user agent.

In an embodiment, the B2BUA compares the call state information in the 200 OK message to the call state information in the out-of-dialog SIP REFER message. In response to the call state information in the 200 OK message matching the call state information in the out-of-dialog SIP REFER message, the out-of-dialog SIP REFER message is sent to the second user agent.

In an embodiment, the call state information for the SIP session dialog between the first user agent and the second user agent comprises call state information for a SIP dialog between the B2BUA and the first user agent.

In an embodiment, the first user agent stores a time associated with the establishment of the SIP session dialog between the first user agent and the second user agent. The first user agent sends the out-of-dialog SIP REFER message based on the server accessible value being after the time associated with the establishment of the SIP session dialog between the first user agent and the second user agent. The server accessible value is at least one of an indication of how long the SIP server has been running, a time since the SIP server failed over, a time since the SIP module in the SIP server was restarted on another processor or container in the SIP server 120, and a time since the SIP session dialog between the first user agent and the second timed out.

In an embodiment, a Session Initiation Protocol (SIP) server comprises a SIP module configured to: establish a SIP session dialog between a first user agent and a second user agent, receive from the first user agent, an in-dialog message for the SIP session dialog between the first user agent and the second user agent, wherein the SIP server is no longer aware of the SIP session dialog, in response to receiving the in-dialog message for the SIP session dialog between the first user agent and the second user agent, send a request not found message to the first user agent, wherein the request not found message comprises a server accessible value, receive from the first user agent, an out-of-dialog SIP REFER message for the second user agent, wherein the out-of-dialog SIP REFER message comprises call state information for the SIP session dialog between the first user agent and the second user agent and the out-of-dialog SIP REFER message is sent based on the server accessible value, send the out-of-dialog SIP REFER message to the second user agent, and reestablish the SIP session dialog between the first user agent and the second user agent. The system includes a timer module configured to generate the accessible value.

In an embodiment, the SIP server is a SIP proxy server. The SIP module is further configured to establish a media session directly between the first user agent and the second user agent.

In an embodiment, the SIP server is a Back-to-Back User Agent (B2BUA) and the SIP module is further configured to send to the second user agent a SIP OPTIONS query message comprising a request for call-state information for a SIP dialog between the B2BUA and second user agent. In response to the SIP OPTIONS query message the SIP module is configured to receive from the second user agent a 200 OK message that includes the call state information for the SIP dialog between the B2BUA and the second user agent.

In an embodiment, reestablishing the SIP session dialog between the first user agent and the second user agent comprises reestablishing the SIP dialog between the B2BUA and the second user agent and reestablishing a SIP dialog between the B2BUA and the first user agent.

In an embodiment, the second user agent sends the 200 OK message that includes the call state information for the SIP dialog between the B2BUA and the second user agent if a match among active calls is found in the second user agent.

In an embodiment, the call state information for the SIP dialog between the B2BUA and the second user agent comprises a session ID for the SIP session dialog between the first user agent and the second user agent. The B2BUA uses the session ID for the SIP session dialog to reestablish the SIP session dialog between the first user agent and the second user agent.

In an embodiment, the call state information for the SIP dialog between the B2BUA and the second user agent does not include a session ID for the SIP session dialog between the first user agent and the second user agent. The call state information for the SIP dialog between the B2BUA and the second user agent comprises a To field and a From field. The To field and the From field are used to reestablish the SIP session dialog between the first user agent and the second user agent.

In an embodiment, the B2BUA compares the call state information in the 200 OK message to the call state information in the out-of-dialog SIP REFER message. In response to the call state information in the 200 OK message matching the call state information in the out-of-dialog SIP REFER message, the out-of-dialog SIP REFER message is sent to the second user agent.

In an embodiment, the SIP module is further configured to store a time associated with the establishment of the SIP session dialog between the first user agent and the second user agent. The first user agent sends the out-of-dialog SIP REFER message based on the server accessible value being after the time associated with the establishment of the SIP session dialog between the first user agent and the second user agent. The server accessible value is at least one of an indication of how long the SIP server has been running, a time since the SIP server failed over, a time since the SIP module in the SIP server was restarted on another processor or container in the SIP server, and a time since the SIP session dialog between the first user agent and the second timed out.

In an embodiment, a computer readable medium having stored thereon instructions that cause a processor to execute a method is used. The computer readable medium comprises instructions to establish a Session Initiation Protocol (SIP) dialog between a first user agent and a second user agent; instructions to receive from the first user agent, an in-dialog message for the SIP session dialog between the first user agent and the second user agent, wherein the SIP server is no longer aware of the SIP session dialog; in response to receiving the in-dialog message for the SIP session dialog between the first user agent and the second user agent, instructions to send a request not found message to the first user agent, wherein the request not found message comprises a server accessible value; instructions to receive from the first user agent an out-of-dialog SIP REFER message for the second user agent, wherein the out-of-dialog SIP REFER message comprises call state information for the SIP session dialog between the first user agent and the second user agent and the out-of-dialog SIP REFER message is sent based on the server accessible value; instructions to send the out-of-dialog SIP REFER message to the second user agent; and instructions to reestablish the SIP session dialog between the first user agent and the second user agent.

DETAILED DESCRIPTION

Figure 1:
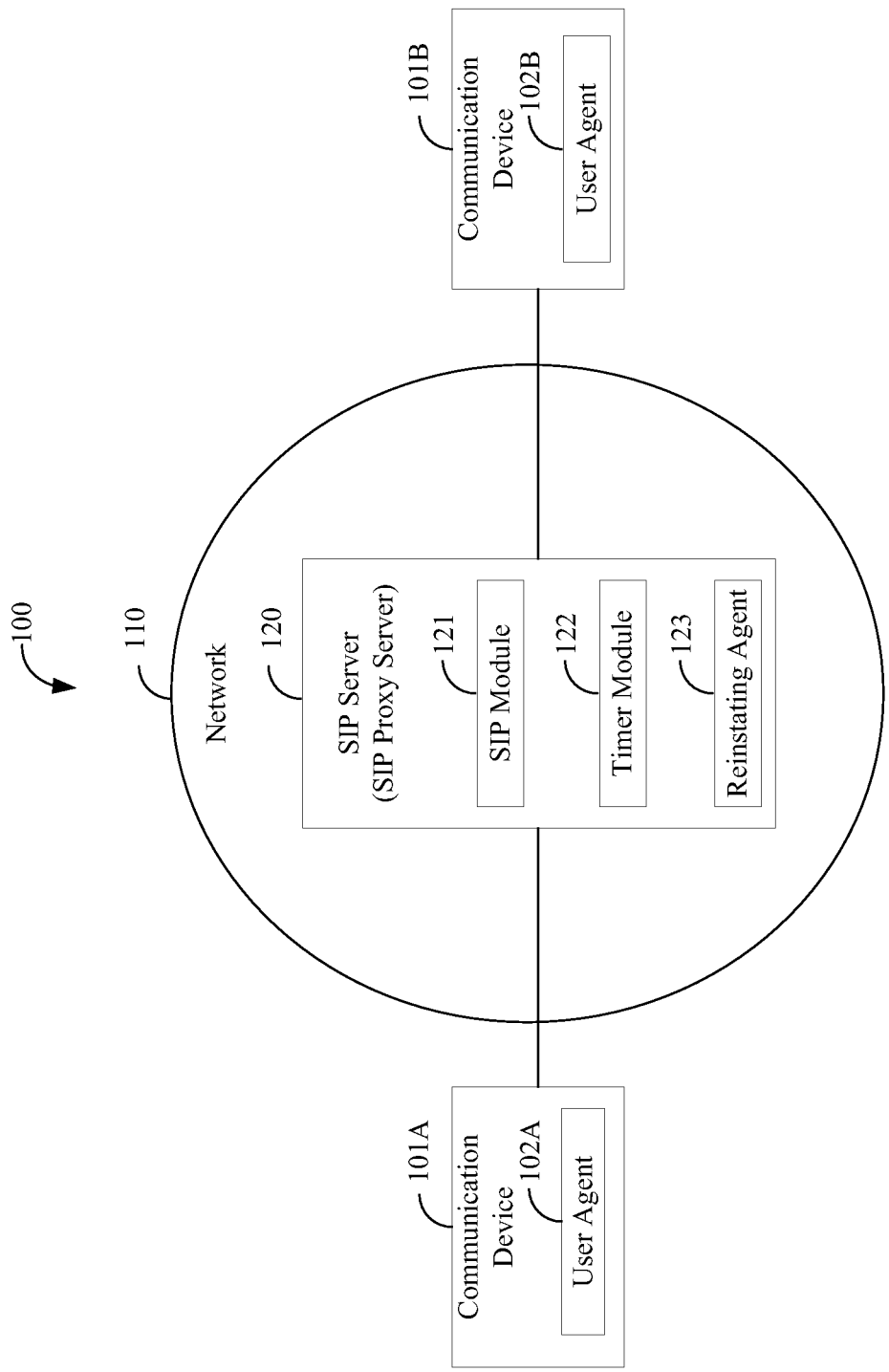
FIG. 1 is a block diagram of a first illustrative system for reconstructing a Session Initiation Protocol (SIP) dialog.

FIG. 1 is a block diagram of a first illustrative system 100 for reconstructing a Session Initiation Protocol (SIP) dialog. The first illustrative system 100 comprises communication devices 101A-101B, network 110, and SIP server 120. The communication devices 101A-101B can be any device that can communicate with the network 110, such as a telephone, a Personal Computer (PC), a tablet device, a cellular telephone, a Personal Digital Assistant (PDA), a television, a set-top box, a FAX machine, a pager, and the like. In this illustrative embodiment, two communication devices 101A-101B are shown connected to the network 110. However, any number of communication devices may be connected to the network 110. In FIG. 1, the communication devices 101A-101B are shown connected to the SIP server 120 via the network 110. However, in an embodiment, the communication devices 101A-101B may be directly connected to SIP server 120.

The communication devices 101A-102B comprises a user agent 102. The user agent 102 can be any hardware/software that can process SIP communications such as a SIP telephone application, a SIP Instant Messaging (IM) application, a SIP video conference application, a SIP email application, a SIP softphone in a PC, a SIP application in a set-top box, and the like. The user agent 102 may communicate with the SIP server 120 and/or another user agent 102. For example, user agent 102A may communicate directly with SIP server 120 and/or user agent 102B.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, any combination of these, and the like. The network 110 can use a variety of protocols, such as Ethernet, Internet Protocol (IP), Session Initiation Protocol (SIP), Asynchronous Transfer Mode (ATM), Integrated Services Digital Network (ISDN), H.323, and the like.

The SIP server 120 can be any hardware/software that can process communications on network 110, such as a network server, a Private Branch Exchange (PBX), a Session Manager, a communication system, a router, a central exchange, and/or the like. The SIP server 120 can comprise one or more processors or memories (not shown) and be distributed across multiple devices on network 110. The SIP server 120 comprises a SIP module 121, a timer module 122, and a reinstating agent 123.

The SIP module 121 can be any hardware/software that can process SIP messages. In some embodiments, the SIP module 121 is a SIP proxy server. In other embodiments, the SIP module 121 is a Back-to-Back User Agent (B2BUA). In still other embodiments, the SIP module 121 may comprise both a SIP proxy server and a B2BUA. The SIP proxy server and the B2BUA may reside in separate SIP modules 121 that reside on different devices in different networks 110. Although there is only a single SIP module 121 shown in FIG. 1, illustrative system 100 may comprise multiple SIP servers 120/SIP modules 121/SIP timer modules 122/reinstating agents 123 comprising multiple SIP proxy servers and/or B2BUAs.

The timer module 122 can be any hardware/software that can determine how long the SIP server 120 has been up/active. The reinstating agent 123 can be any hardware/software that is used to reinstate the SIP server 120, such as boot firmware, self-test code, boot software, failover software, and/or the like.

In this exemplary embodiment, the SIP server 120 is a SIP proxy server. The SIP module 121 is configured to establish a SIP session dialog between the user agent 102A and the user agent 102B using standard SIP processes. In addition, other user agents 102 (not shown) may be involved in the SIP session dialog. For example, more than two user agents 102 may be involved in a video conference or voice conference.

Once the SIP session dialog between user agents 102A and 102B is established, a media session can be directly established between the user agents 102A and 102B. For example, a voice or video media stream may be established between user agents 102A and 102B using Real Time Protocol (RTP). In this illustrative embodiment, the media stream is not sent through the SIP Proxy server 120. However, in other embodiments the media steam may be sent through the SIP proxy server 120. The SIP dialog between the user agent 102A and the user agent 102B may fail (e.g., because of a failure of the SIP proxy server 120) while the media session is still be active because the SIP proxy server 120 is not involved in the media session.

The SIP proxy server 120, while the media stream is still active, may at some point, no longer be aware of the SIP session dialog between the user agent 102A and the user agent 102B. This may be for various reasons, such as, a hardware failure, a software failure, a firmware failure, a power failure, a network failure, and/or the like. The SIP proxy server 120 may be unaware of the SIP session dialog between the user agent 102A and the user agent 102B because the SIP proxy server 120 failed over by reinstating agent 123 to a new SIP proxy server 120. Alternatively, the SIP proxy server 120 may be unaware of the SIP session dialog between the user agent 102A and the user agent 102B because the system was failed over by reinstating agent 123 to a new SIP proxy server 120 due to part of the network 110 failing. In another embodiment, the SIP proxy server 120 may be unaware of the SIP session dialog between the user agent 102A and the user agent 102B because of a software failure or power failure causing the SIP proxy server to be rebooted. In still another embodiment, the SIP proxy server 120 may be unaware of the SIP session dialog because a new process of SIP module 121 was started by reinstating agent 123 on another processor/container in SIP proxy server 120 due to a hardware failure. The SIP proxy server 120 may be unaware of the SIP session dialog because access to the SIP proxy server was temporarily unavailable and the communication session with the SIP module 121 timed-out and was dropped.

The SIP module 121 receives, from the user agent 102A, an in-dialog message for the SIP session dialog between the user agent 102A and the user agent 102B. The in-dialog message can be any in-dialog message, such as, an ACK request to a 2xx INVITE response, an ACK request for a 3xx-6xx INVITE response, an in-dialog INVITE request, an in-dialog non-INVITE request, a provisional response, a 2xx response to INVITE, a 3xx-6xx response to INVITE, a final response to an out-of-dialog non-INVITE request, a final response to an in-dialog non-INVITE request, a PRACK request, and the like.

In response to receiving the in-dialog message for the SIP session dialog between the user agent 102A and the user agent 102B, the SIP module 121 sends a request not found message to user agent 102A. The request not found message also comprises a server accessible value generated by timer module 122. The server accessible value is a value that indicates how long the SIP proxy server 120 has been accessible. For example, the server accessible value may indicate how long the server has been running since the SIP proxy server 120 was initialized. Alternatively, if the SIP proxy server 120 failed over to a new SIP proxy server 120, the server accessible value may be the time since the failover. In another embodiment the server accessible time can be a time since the SIP module 121 in the SIP proxy server 120 was restarted on another processor or container in the SIP proxy server 120. If the SIP proxy server 120 became inaccessible and the SIP session dialog between the user agent 102A and the user agent 102B was timed out, the server accessible value can be the time since the SIP session dialog between the user agent 102A and the user agent 102B timed out.

The user agent 102A receives the request not found message with the server accessible value. The user agent 102A previously stored a time associated with the establishment of the SIP session dialog between the user agent 102A and the user agent 102B. The user agent 102A compares the time associated with the establishment of the SIP session dialog to the server accessible value. If the server accessible value is after the time associated with the establishment of the SIP session dialog, the user agent 102A sends an out-of-dialog SIP REFER message to the user agent 102B via SIP proxy server 120. The out-of-dialog SIP REFER message comprises call state information for the SIP session dialog between the user agent 102A and the user agent 102B. The call state information for the SIP session dialog between the use agent 102A and the user agent 102B can comprise an Universal Resource Identifier (URI) of communication device 101A (in To or From headers), a URI of communication device 101B (in To or From headers), a session ID for the SIP dialog between user agent 102A and the user agent 102B, a last CSequence/Resequence value, a contact for the user agent 102, and/or the like.

The out-of-dialog SIP REFER message is sent by the SIP module 121 to the user agent 102B. The user agent 102B receives the out-of-dialog SIP REFER message from the SIP module 121. In response to receiving the out-of-dialog SIP REFER message, the user agent 102B sends a SIP INVITE to the SIP proxy server 120. The SIP INVITE contains the necessary URIs from the out-of-dialog SIP REFER message to reestablish the SIP session dialog between the user agent 102A and the user agent 102B. The SIP module 121 receives the SIP INVITE from the user agent 102B. The SIP module 121 sends the SIP INVITE to the user agent 102A. The SIP session dialog between the user agent 102A and the user agent 102B can now be reestablished using the same process that was used to establish the initial SIP session dialog between the user agent 102A and the user agent 102B.

Figure 2:
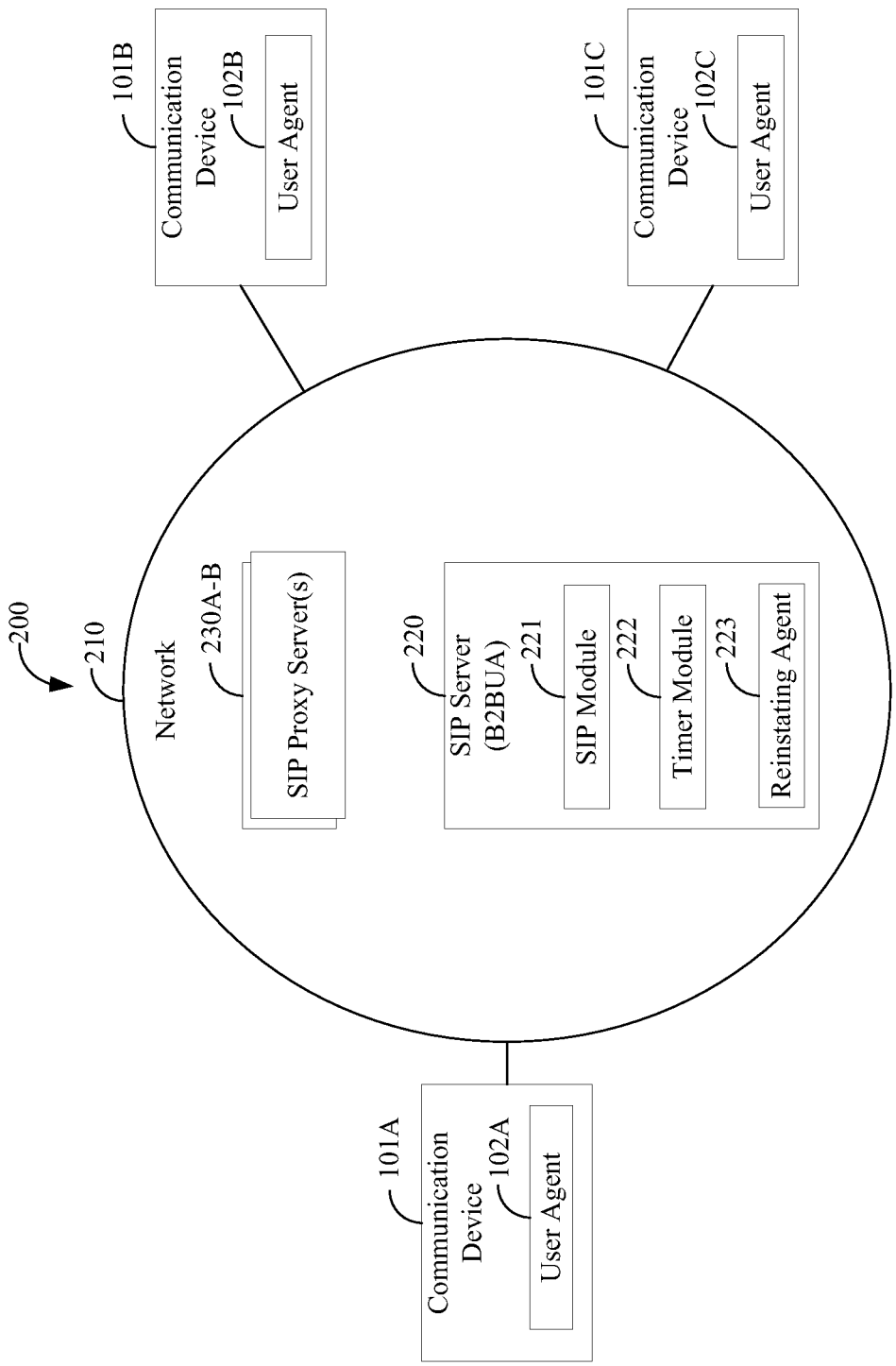
FIG. 2 is a block diagram of a second illustrative system for reconstructing a Session Initiation Protocol (SIP) dialog.

FIG. 2 is a block diagram of a second illustrative 200 system for reconstructing a Session Initiation Protocol (SIP) dialog. The second illustrative system 200 comprises communication devices 101A-101C, network 210, SIP server 220 (a B2BUA), and SIP proxy server(s) 230A-B. The communication devices 101A-101C can be any device that can communicate with the network 210, such as a telephone, a Personal Computer (PC), a tablet device, a cellular telephone, a Personal Digital Assistant (PDA), a television, a set-top box, a FAX machine, a pager, and the like. In this illustrative embodiment, three communication devices are shown connected to the network 210. However, any number of communication devices may be connected to the network 210. In FIG. 2, the communication devices 101A-101C are shown connected to the SIP server 220 and SIP proxy servers 230A-230B via the network 210. However, the communication devices 101A-101B may be directly connected to SIP server 220 and/or SIP proxy servers 230A-230B.

The communication devices 101A-102C comprise a user agent 102. The user agent 102 can be any hardware/software that can process SIP communications such as a SIP telephone application, a SIP Instant Messaging (IM) application, a SIP video conference application, a SIP email application, a SIP softphone in a PC, a SIP application in a set-top box, and the like. The user agent 102 may communicate with SIP server 120 and/or another user agent 102.

The network 210 can be any network that can send and receive information, such as the Internet, a Wide Area Network (WAN), a Local Area Network (LAN), the Public Switched Telephone Network (PSTN), a packet switched network, a circuit switched network, a cellular network, any combination of these, and the like. The network 210 can use a variety of protocols, such as Ethernet, Internet Protocol (IP), Session Initiation Protocol (SIP), Asynchronous Transfer Mode (ATM), Integrated Services Digital Network (ISDN), H.323, and the like.

The SIP server 220 (B2BUA 220) can be any hardware/ software that can process communications on network 210, such as a network server, a Private Branch Exchange (PBX), a Session Manager, a communication system, a router, a central exchange, and/or the like. The B2BUA 220 can comprise one or more processors or memories (not shown) and be distributed across multiple devices in network 210. The B2BUA 220 comprises SIP module 221, timer module 222, and reinstating agent 223.

The SIP module 221 can be any hardware/software that can process SIP messages as part of a B2BUA. The SIP module 221 can handle B2BUA functions, such as being inserted into a call dialog, being inserted into a media stream, call forwarding, call recording, call transfer, call mixing, and the like. The timer module 122 can be any hardware/software that can determine how long the B2BUA 220 has been up/active. The reinstating agent 223 can be any hardware/software that is used to reinstate the B2BUA 220, such as boot firmware, self-test code, boot software, failover software, and/or the like.

The SIP proxy servers 230A-230B can be any SIP proxy server that can provide proxy services for communication devices 101A-101C. The SIP proxy servers 230A-230B can be similar or different from SIP proxy server 120.

The SIP proxy servers 230A-230B in conjunction with B2BUA 220 are configured to establish a SIP session dialog between the user agent 102A and the user agent 102B using standard SIP processes. The SIP session dialog between the user agent 102A and the user agent 120B may be established using only one of the SIP proxy servers 230 (e.g., proxy server 230A), both of the proxy servers 230A and 230B, and/or with additional proxy servers (not shown). In addition, other user agents 102C may be involved in the SIP session dialog. For example, more than two user agents 102 may be involved in a video conference or voice conference. When the B2BUA 220 is used in a SIP session dialog between the user agent 102A and the user agent 102B, the SIP session dialog comprises a SIP dialog between user agent 102A and B2BUA 220 along with a second SIP dialog between B2BUA 220 and user agent 102B. For further discussion of this process, see the detailed explanation described in FIG. 4.

Once the SIP session dialog between user agents 102A and 102B is established, a media session can be directly established between the user agents 102A and 102B. The SIP dialog between the user agent 102A and the user agent 102B may fail (e.g., because of a hardware failure of the B2BUA 220) and the media session may still continue because the B2BUA 220 is not involved in the media session. In addition, if SIP session dialog was between communication devices 101A-101C (i.e., in a conference) a media stream for the conference may be established between communication devices 101A-101C. In this illustrative embodiment, the media stream is not sent through the SIP Proxy servers 230A-230B or the B2BUA 220. However, in other embodiments the media steam may be sent through the SIP proxy servers 230 and/or the B2BUA 220.

The B2BUA 220, while the media stream is still active, may at some point, no longer be aware of the SIP session dialog between the user agent 102A and the user agent 102B. This may be for various reasons, such as, a hardware failure, a software failure, a firmware failure, a power failure, a network failure, and/or the like. The B2BUA 220 may be unaware of the SIP session dialog between the user agent 102A and the user agent 102B because the B2BUA 220 was failed over by reinstating agent 223 to a new B2BUA 220. Alternatively, the B2BUA 220 may be unaware of the SIP session dialog between the user agent 102A and the user agent 102B because the system was failed over by reinstating agent 223 to a new B2BUA 220 due to part of the network 210 failing. In another embodiment, the B2BUA 220 may be unaware of the SIP session dialog between the user agent 102A and the user agent 102B because of a software failure or power failure and the B2BUA 220 was rebooted by reinstating agent 223. In still another embodiment, the B2BUA 220 may be unaware of the SIP session dialog between the user agent 102A and the user agent 102B because a new process of SIP module 221 was started by reinstating agent 223 on another processor/container in B2BUA 220 due to a hardware failure. The B2BUA 220 may be unaware of the SIP session dialog because access to the B2BUA 220 was temporarily unavailable and the SIP dialog between the user agent 102A and the user agent 102B timed-out and was dropped.

The SIP proxy server 230A receives, from the user agent 102A, an in-dialog message for the SIP session dialog between the user agent 102A and the user agent 102B. The SIP proxy server 230A sends the in-dialog message for the session dialog between the user agent 102A and the BUBUA 220 to SIP module 221. The in-dialog message can be any in-dialog message, such as, an ACK request to a 2xx INVITE response, an ACK request for a 3xx-6xx INVITE response, an in-dialog INVITE request, an in-dialog non-INVITE request, a provisional response, a 2xx response to INVITE, a 3xx-6xx response to INVITE, a final response to an out-of-dialog non-INVITE request, a final response to an in-dialog non-INVITE request, a PRACK request, and the like.

In response to receiving the in-dialog message for the SIP session dialog between the user agent 102A and the B2BUA 220, the SIP module 221 sends a request not found message to the SIP proxy server 230A. The request not found message also comprises a server accessible value generated by timer module 222. The server accessible value is a value that indicates how long the B2BUA 220 has been accessible. For example, the server accessible value may indicate how long the B2BUA 220 has been running since the B2BUA 220 was initialized. Alternatively, if the B2BUA 220 failed over to a new B2BUA 220, the server accessible value may be the time since the failover. In another embodiment, the server accessible time can be a time since the SIP module 221 in the B2BUA 220 was restarted on another processor or container in the B2BUA 220. If the B2BUA 220 became inaccessible and the SIP session dialog between the user agent 102A and the user agent 102B was timed out, the server accessible value can be the time since the SIP session dialog between the user agent 102A and the user agent 102B timed out.

The request not found message with the server accessible value is sent from the SIP proxy server 230A to user agent 102A. The user agent 102A receives the request not found message with the server accessible value. The user agent 102A previously stored a time associated with the establishment of the SIP dialog between the user agent 102A and the B2BUA 220. The user agent 102A compares the time associated with the establishment of the SIP session dialog to the server accessible value. If the server accessible value is after the time associated with the establishment of the SIP session dialog, the user agent 102A sends an out-of-dialog SIP REFER message to the proxy server 230A. The out-of-dialog SIP REFER message comprises call state information for the SIP dialog between the user agent 102A and the B2BUA 220. The call state information for the SIP dialog between the use agent 102A and the B2BUA 220 can comprise a Universal Resource Identifier (URI) of communication device 101A (in To or From headers), a URI of communication device 101B (in To or From headers), a session ID for the dialog, a last CSequence/Resequence value, a contact for the user agent 102, and/or the like.

The out-of-dialog SIP REFER message is sent by the SIP proxy server 230A to the SIP module 221. The SIP module looks at the call state information in the SIP REFER message and invokes a procedure for reestablishing the SIP session dialog between user agent 102A and user agent 102B. The SIP module 221 sends a SIP OPTIONS query message to the SIP proxy server 230B (assuming communication device 101B uses a different SIP proxy server 230B than communication device 101A). The SIP proxy server 230B sends the SIP OPTIONS query message to the user agent 102B.

The user agent 102B responds to the SIP OPTIONS query message by sending a 200 OK message that includes information on any active calls that the user agent 102B currently has to the SIP proxy server 230B. Since there is an active call for the SIP dialog between the user agent 102B and the B2BUA 220, the call state information for the SIP dialog between the user agent 102B and the B2BUA 220 will be included in the 200 OK message. The 200 OK message with call state information for the SIP dialog between the user agent 102B and the B2BUA 220 is sent from the SIP proxy server 230B to the SIP module 221.

The SIP module 221 compares the call state information in the 200 OK message sent from the user agent 102B with the call state information in the received from the SIP REFER message received from the user agent 102A. The SIP module 221 can determine if the call state information matches because the SIP module 221 knows that the SIP dialog between the user agent 102A and the B2BUA 220 and the SIP dialog between the user agent 102B and the B2BUA 220 are part of the SIP session dialog between the user agent 102A and the user agent 102B. If the call state information matches, the SIP module 221 sends an out-of-dialog REFER message to the SIP proxy server 230B. The SIP proxy server 230B sends the out-of-dialog REFER message to user agent 102B.

The user agent 102B receives the out-of-dialog SIP REFER message from the SIP proxy server 230B. In response to receiving the out-of-dialog SIP REFER message, the user agent 102B sends a SIP 202 accepted response message for the SIP REFER message to the SIP proxy server 230B. The SIP proxy server 230B sends the 202 accepted response message to the SIP module 221.

Also, in response to receiving the out-of-dialog SIP REFER message, the user agent 102B sends a SIP INVITE with replaces header to the SIP proxy server 230B. The SIP INVITE contains the necessary URIs from the out-of-dialog SIP REFER message to reestablish the SIP session dialog between the user agent 102A and the user agent 102B. The SIP proxy server 230B sends the SIP INVITE with replaces header to the SIP module 221. The SIP module 221 receives the SIP INVITE with replaces header from the SIP proxy server 230B. The SIP module 121 sends the SIP INVITE with replaces header to the SIP proxy server 230A. The SIP proxy server 230A sends the SIP INVITE with replaces header to the user agent 102A. The user agent 102A sends a 200 OK in response to the SIP INVITE with replaces header to the SIP proxy server 230A, which in turns sends the 200 OK to the SIP module 221. The SIP module 221 sends the 200 OK to the SIP proxy server 230B, which in turn sends the 200 OK to the user agent 102B.

The user agent 102A sends a SIP BYE message for the original SIP dialog between the user agent 102A and the B2BUA 220 to the SIP proxy server 230A, which in turn sends the SIP BYE message for the SIP dialog between the user agent 102A and the B2BUA 220 to the SIP module 221. Likewise, the user agent 102B sends a SIP BYE message for the original SIP dialog between the user agent 102B and the B2BUA 220 to the SIP proxy server 230B, which in turn sends the SIP BYE message for the original for the original SIP dialog between the user agent 102B and the B2BUA 220 to the SIP module 221. At this point, the session dialog between the user agent 102A and the user agent 102B is reestablished and normal SIP call processing can ensue.

The SIP proxy server 230A, in conjunction with B2BUA 220, is configured to establish a SIP session dialog between the user agents 102A-102C using standard SIP processes. In this example, the SIP signaling that is sent to user agent 102B is also forked to user agent 102C. Forking is used to allow a second communication device 101C to, for example, to ring at the same time as when a call is received at communication device 101B. In other examples, this may be a conference call.

Once the SIP session dialog between user agents 102A-102C is established, a media session can be directly established between the user agents 102A-102C. In this illustrative embodiment, the media stream is not sent through the SIP Proxy server 230A or the B2BUA 220. However, in other embodiments the media steam may be sent through the SIP proxy server 230A and/or the B2BUA 220.

The B2BUA 220, while the media stream is still active, may at some point, may no longer be aware of the SIP session dialog between the user agents 102A-102C. After this, the SIP module 221 receives, from the user agent 102A, an in-dialog message for the SIP session dialog between the user agents 102A-102C. In response to receiving the in-dialog message for the SIP session dialog between the user agent 102A and the B2BUA 220, the SIP module 221 sends a request not found message to the user agent 102A. The request not found message also comprises a server accessible value generated by timer module 222.

The user agent 102A receives the request not found message with the server accessible value. The user agent 102A previously stored a time associated with the establishment of the SIP dialog between the user agent 102A and the B2BUA 220. The user agent 102A compares the time associated with the establishment of the SIP session dialog to the server accessible value. If the server accessible value is after the time associated with the establishment of the SIP session dialog, the user agent 102A sends an out-of-dialog SIP REFER message to the SIP module 221. The out-of-dialog SIP REFER message comprises call state information for the SIP dialog between the user agent 102A and the B2BUA 220.

The SIP module 221 looks at the call state information in the SIP REFER message and invokes a procedure for reestablishing the SIP session dialog between the user agents 102A-102C by getting call state information from the user agents 102B and 102C. The SIP module 221 sends a SIP OPTIONS query message to the SIP proxy server 230B. The SIP proxy server 230B sends the SIP OPTIONS query message to the user agent 102B. In addition, since the previous SIP dialog was forked, the SIP proxy server 230B also sends the SIP OPTIONS query message to the user agent 102C.

The user agent 102B responds to the SIP OPTIONS query message by sending a 200 OK message that includes information on any active calls that the user agent 102B currently has to the SIP proxy server 230B. Since there is an active call for the SIP dialog between the user agent 102B and the B2BUA 220, the call state information for the SIP dialog between the user agent 102B and the B2BUA 220 will be included in the 200 OK message. Likewise, the user agent 102C responds with a similar 200 OK message to the SIP proxy server 230B. The 200 OK message with call state information for the SIP dialog between the user agent 102B and the B2BUA 220 is sent from the SIP proxy server 230B to the SIP module 221. Likewise, a 200 OK message with call state information for the SIP dialog between the user agent 102C and the B2BUA 220 is sent from the SIP proxy server 230B to the SIP module 221.

The SIP module 221 compares the call state information in the 200 OK messages sent from the user agent 102B and the user agent 102C with the call state information in the SIP REFER message received from the user agent 102A. The SIP module 221 can determine if the call state information matches because the SIP module knows that the SIP dialog between the user agent 102A and the B2BUA 220 and the SIP dialogs between the user agents 102B-102C and the B2BUA 220 are part of the SIP session dialog between the user agents 102A-102C. If the call state information matches, the SIP module 221 sends an out-of-dialog REFER message to the SIP proxy server 230B. The SIP proxy server 230B sends the out-of-dialog REFER message to the user agent 102C.

The user agent 102C receives the out-of-dialog SIP REFER message from the SIP proxy server 230B. In response to receiving the out-of-dialog SIP REFER message, the user agent 102C sends a SIP 202 accepted response message for the SIP REFER message to the SIP proxy server 230B. The SIP proxy server 230B sends the 202 accepted response message to the SIP module 221.

Also, in response to receiving the out-of-dialog SIP REFER message, the user agent 102C sends a SIP INVITE with replaces header to the SIP proxy server 230B. The SIP INVITE with replaces header contains the necessary URIs from the out-of-dialog SIP REFER message to reestablish the SIP session dialog between the user agent 102A and the user agent 102C and 102B. The SIP proxy server 230B sends the SIP INVITE with the replaces header to the SIP module 221. The SIP module 121 sends the SIP INVITE with the replaces header to the user agent 102A. The user agent 102A sends a 200 OK in response to the SIP INVITE with the replaces header to the SIP proxy server 230A. The SIP proxy server 230A sends the SIP INVITE with the replaces header to the SIP module 221, which in turns sends the 200 OK to the SIP proxy server 230B. The SIP proxy server 230B sends the 200 OK to the user agent 102B.

The user agent 102B sends a SIP BYE message for the original SIP dialog between the user agent 102A and the B2BUA 220 to the SIP proxy server 230B, which in turn sends the SIP BYE message to SIP module 221. Likewise, the user agent 102C sends a SIP BYE message for the original SIP dialog between the user agent 102C and the B2BUA 220 to the SIP proxy server 230B, which in turn sends the SIP BYE message for the original for the original SIP dialog between the user agent 102C and the B2BUA 220 to the SIP module 221. At this point, the session dialog between the user agent 102A and the user agent 102B is reestablished and normal SIP call processing can ensue.

Figure 3:
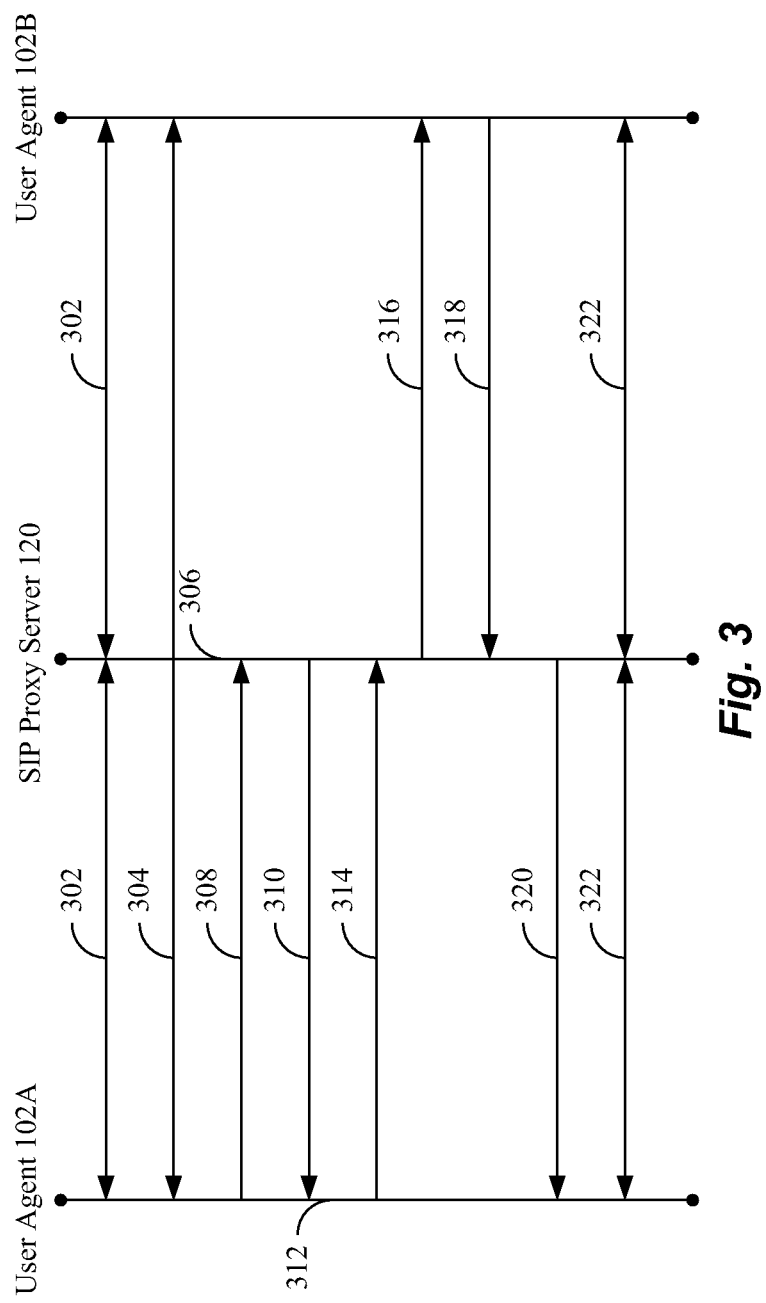
FIG. 3 is a flow diagram of a method for reconstructing a Session Initiation Protocol (SIP) dialog setup by a SIP proxy server.
Figure 4:
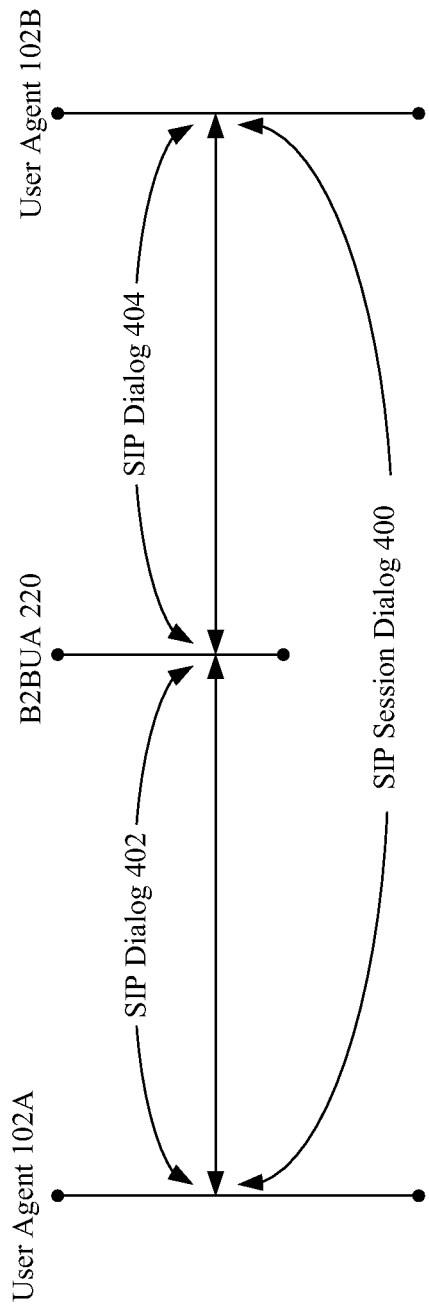
FIG. 4 is a diagram of dialogs in a communication session using a Back-to-Back User Agent.
Figure 5:
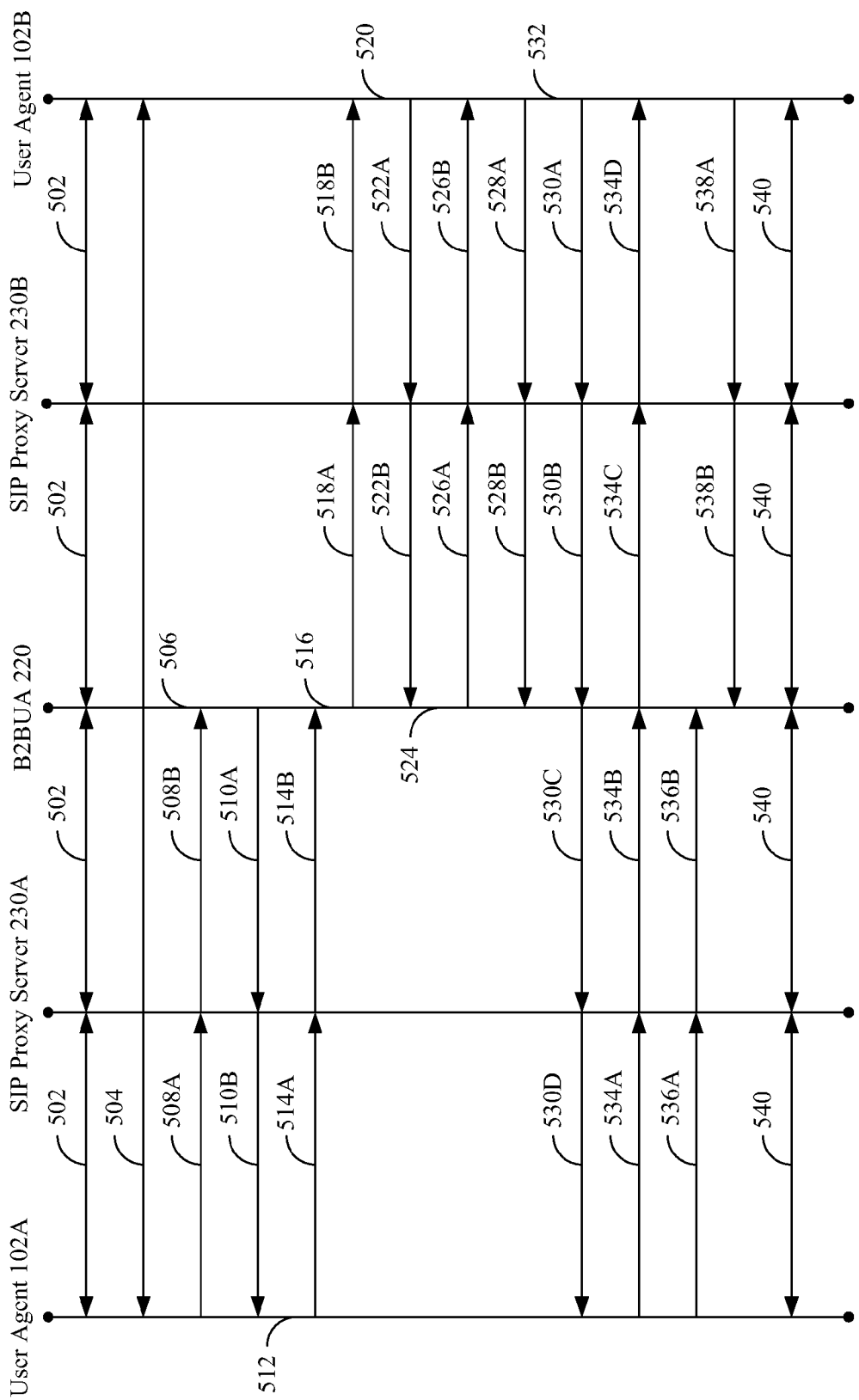
FIG. 5 is a flow diagram of a method for reconstructing a Session Initiation Protocol (SIP) dialog setup with a Back-to-Back User Agent (B2BUA).

FIG. 3 is a flow diagram of a method for reconstructing a Session Initiation Protocol (SIP) dialog setup by a SIP proxy server. Illustratively, the communication devices 101A-101C, the user agents 102A-102C, the SIP proxy servers 120 and 230, the B2BUA 220, the SIP modules 121 and 221, the timer modules 122 and 222, and the reinstating agents 123 and 223, are stored-program-controlled entities, such as a computer or processor, which performs the method of FIGS. 3-5 and the processes described herein by executing program instructions stored in a tangible computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

A SIP session dialog is established between the user agent 102A and user agent 102B using standard SIP processes in step 302. Once the SIP session dialog between user agents 102A and 102B is established in step 302, a media session can be directly established 304 between the user agents 102A and 102B.

The SIP proxy server 120, while the media stream is still active, may at some point, no longer is aware 306 of the SIP session dialog between the user agent 102A and the user agent 102B. The SIP proxy server 120 receives 308, from the user agent 102A, an in-dialog message for the SIP session dialog between the user agent 102A and the user agent 102B. In response to receiving the in-dialog message for the SIP session dialog between the user agent 102A and the user agent 102B, the SIP proxy server 120 sends 310 a request not found message to user agent 102A. The request not found message also comprises a server accessible value. The server accessible value is a value that indicates how long the SIP proxy server 120 has been accessible.

The user agent 102A receives 310 the request not found message with the server accessible value. The user agent 102A previously stored a time associated with the establishment of the SIP session dialog between the user agent 102A and the user agent 102B. The user agent 102A compares 312 the time associated with the establishment of the SIP session dialog to the server accessible value. If the server accessible value is after the time associated with the establishment of the SIP session dialog, the user agent 102A sends 314 an out-of-dialog SIP REFER message to the user agent 102B via the SIP proxy server 120. The out-of-dialog SIP REFER message comprises call state information for the SIP session dialog between the user agent 102A and the user agent 102B.

The out-of-dialog SIP REFER message is sent 316 by the SIP module 121 to the user agent 102B. The user agent 102B receives 316 the out-of-dialog SIP REFER message from the SIP proxy server. In response to receiving the out-of-dialog SIP REFER message, the user agent 102B sends 318 a SIP INVITE to the SIP proxy server 120. The SIP INVITE contains the necessary URIs from the out-of-dialog SIP REFER message to reestablish the SIP session dialog between the user agent 102A and the user agent 102B. The SIP proxy server 120 receives 318 the SIP INVITE from the user agent 102B. The SIP proxy server 120 sends 320 the SIP INVITE to the user agent 102A. The SIP session dialog between the user agent 102A and the user agent 102B can now be reestablished 322 using the same process that was used to establish the initial SIP session dialog between the user agent 102A and the user agent 102B.

FIG. 4 is a diagram of dialogs in a communication session using a Back-to-Back User Agent. When a SIP session is established between the user agent 102A and 102B, if the B2BUA 220 is not involved, there is only a single SIP session dialog 400. However, if the B2BUA 220 is involved in the communication session between user agent 102A and user agent 102B, there are two SIP dialogs 402 and 404 that comprise the SIP session dialog between the user agent 102A and the user agent 102B. To establish the SIP session dialog 400, a SIP dialog 402 is setup between user agent 102A and the B2BUA 220. Likewise, a second SIP dialog is setup between user agent 102B and the B2BUA. These two SIP dialogs 402 and 404 comprise the SIP session dialog between the user agent 102A and the user agent 102B.

FIG. 5 is a flow diagram of a method for reconstructing a Session Initiation Protocol (SIP) dialog setup with a Back-to-Back User Agent (B2BUA). The SIP proxy servers 230A-230B in conjunction with B2BUA 220 are configured to establish 502 a SIP session dialog between the user agent 102A and the user agent 102B using standard SIP processes. Once the SIP session dialog between user agents 102A and 102B is established, a media session can be directly established 504 between the user agents 102A and 102B. In this illustrative embodiment, the media stream is not sent through the SIP Proxy servers 230A-230B or the B2BUA 220.

The B2BUA 220, while the media stream is still active, may at some point, may no longer be aware 506 of the SIP session dialog between the user agent 102A and the user agent 102B. The SIP proxy server 230A receives 508A, from the user agent 102A, an in-dialog message for the SIP session dialog between the user agent 102A and the user agent 102B. The SIP proxy server 230A sends 508B the in-dialog message for the session dialog between the user agent 102A and the BUBUA 220 to SIP module 221 in the B2BUA 220.

In response to receiving the in-dialog message for the SIP session dialog between the user agent 102A and the B2BUA 220, the SIP module 221 in the B2BUA 220 sends 510A a request not found message to the SIP proxy server 230A. The request not found message also comprises a server accessible value generated by timer module 222. The request not found message with the server accessible value is sent 510B from the SIP proxy server 230A to user agent 102A. The user agent 102A receives the request not found message with the server accessible value. The user agent 102A previously stored a time associated with the establishment of the SIP dialog between the user agent 102A and the B2BUA 220. The user agent 102A compares 512 the time associated with the establishment of the SIP session dialog to the server accessible value. If the server accessible value is after the time associated with the establishment of the SIP session dialog, the user agent 102A sends 514A an out-of-dialog SIP REFER message to the proxy server 230A. The out-of-dialog SIP REFER message comprises call state information for the SIP dialog between the user agent 102A and the B2BUA 220. The out-of-dialog SIP REFER message is sent 514B by the SIP proxy server 230A to the SIP module 221 in B2BUA 220.

The SIP module 221 in the B2BUA 220 looks 516 at the call state information in the SIP REFER message and invokes a procedure for reestablishing the SIP session dialog between user agent 102A and the user agent 102B. The SIP module 221 in B2BUA 220 sends 518A a SIP OPTIONS query message to the SIP proxy server 230B (assuming communication device 101B uses a different SIP proxy server 230B than communication device 101A). The SIP proxy server 230B sends 518B the SIP OPTIONS query message to the user agent 102B.

The user agent 102B responds 520 to the SIP OPTIONS query message by sending 522A a 200 OK message that includes information on any active calls that the user agent 102B currently has to the SIP proxy server 230B. Since there is an active call for the SIP dialog between the user agent 102B and the B2BUA 220, the call state information for the SIP dialog between the user agent 102B and the B2BUA 220 will be included in the 200 OK message. The 200 OK message with call state information for the SIP dialog between the user agent 102B and the B2BUA 220 is sent 522B from the SIP proxy server 230B to the SIP module 221 in B2BUA 220.

The SIP module 221 in B2BUA 220 compares 524 the call state information in the 200 OK message sent from the user agent 102B with the call state information in the received from the SIP REFER message received from the user agent 102A. The SIP module 221 can determine if the call state information matches because the SIP module knows that the SIP dialog between the user agent 102A and the B2BUA 220 and the SIP dialog between the user agent 102B and the B2BUA 220 are part of the SIP session dialog between the user agent 102A and the user agent 102B. If the call state information matches, the SIP module 221 in B2BUA 220 sends 526A an out-of-dialog REFER message to the SIP proxy server 230B. The SIP proxy server 230B sends 526B the out-of-dialog REFER message to user agent 102B.

The user agent 102B receives the out-of-dialog SIP REFER message from the SIP proxy server 230B. In response to receiving the out-of-dialog SIP REFER message, the user agent 102B sends 528A a SIP 202 accepted response message for the SIP REFER message to the SIP proxy server 230B. The SIP proxy server 230B sends 528B the 202 accepted response message to the SIP module 221 in B2BUA 220.

Also, in response to receiving the out-of-dialog SIP REFER message 532, the user agent 102B sends 530A a SIP INVITE with replaces header to the SIP proxy server 230B. The SIP INVITE contains the necessary URIs from the out-of-dialog SIP REFER message to reestablish the SIP session dialog between the user agent 102A and the user agent 102B. The SIP proxy server 230B sends 530B the SIP INVITE with replaces header to the SIP module 221 in B2BUA 220. The SIP module 221 in B2BUA 220 receives the SIP INVITE with replaces header from the SIP proxy server 230B. The SIP module 221 in the B2BUA 220 sends 530C the SIP INVITE with replaces header to the SIP proxy server 230A. The SIP proxy server 230A sends 530D the SIP INVITE with replaces header to the user agent 102A. The user agent 102A sends 534A a 200 OK in response to the SIP INVITE with replaces header to the SIP proxy server 230A, which in turns sends 534B the 200 OK to the SIP module 221 in the B2BUA 220. The SIP module 221 in the B2BUA 220 sends 534C the 200 OK to the SIP proxy server 230B, which in turn sends 534D the 200 OK to the user agent 102B.

The user agent 102B sends 536A a SIP BYE message for the original SIP dialog between the user agent 102A and the B2BUA 220 to the SIP proxy server 230A, which in turn sends 536B the SIP BYE message for the SIP dialog between the user agent 102A and the B2BUA 220 to the SIP module 221 in B2BUA 220. Likewise, the user agent 102B sends 538A a SIP BYE message for the original SIP dialog between the user agent 102B and the B2BUA 220 to the SIP proxy server 230B, which in turn sends 538B the SIP BYE message for the original for the original SIP dialog between the user agent 102B and the B2BUA 220 to the SIP module 221 in B2BUA 220. At this point, the session dialog between the user agent 102A and the user agent 102B is reestablished 540 and normal SIP call processing can ensue.

In some environments, sending the SIP INVITE with the replaces header will end up re-sequencing the B2BUA 220. One way to deal with this is to always force the originating communication device 101 to send the SIP INVITE with the replaces header. This will force the same B2BUA 220 sequencing as the original SIP dialog. If the originating communication device 101 starts the dialog reconstruction, then the originating communication device 101 will ask the terminating communication device 101 to send a SIP REFER with its dialog information. If the terminating communication device 101 starts the re-construction, the terminating communication device 101 can directly send the SIP REFER.

Alternatively, the call-reconstruction parameters can be expanded in the SIP REFER. Termination or origination can be specified in the parameters. Instead of using "call-construction" as the parameter, the parameter would be "call-reconstruction-org" or "call-reconstruction-term." The SIP REFER would look like: Refer-To: URI; call-reconstruction-orig? Replaces=[Dialog Parameters]. Alternatively, Refer-To: URI; call-reconstruction-term? Replaces=[Dialog Parameters]. Based on these new parameters, the system can now provide normal sequence or reverse sequencing.

Figure 6:
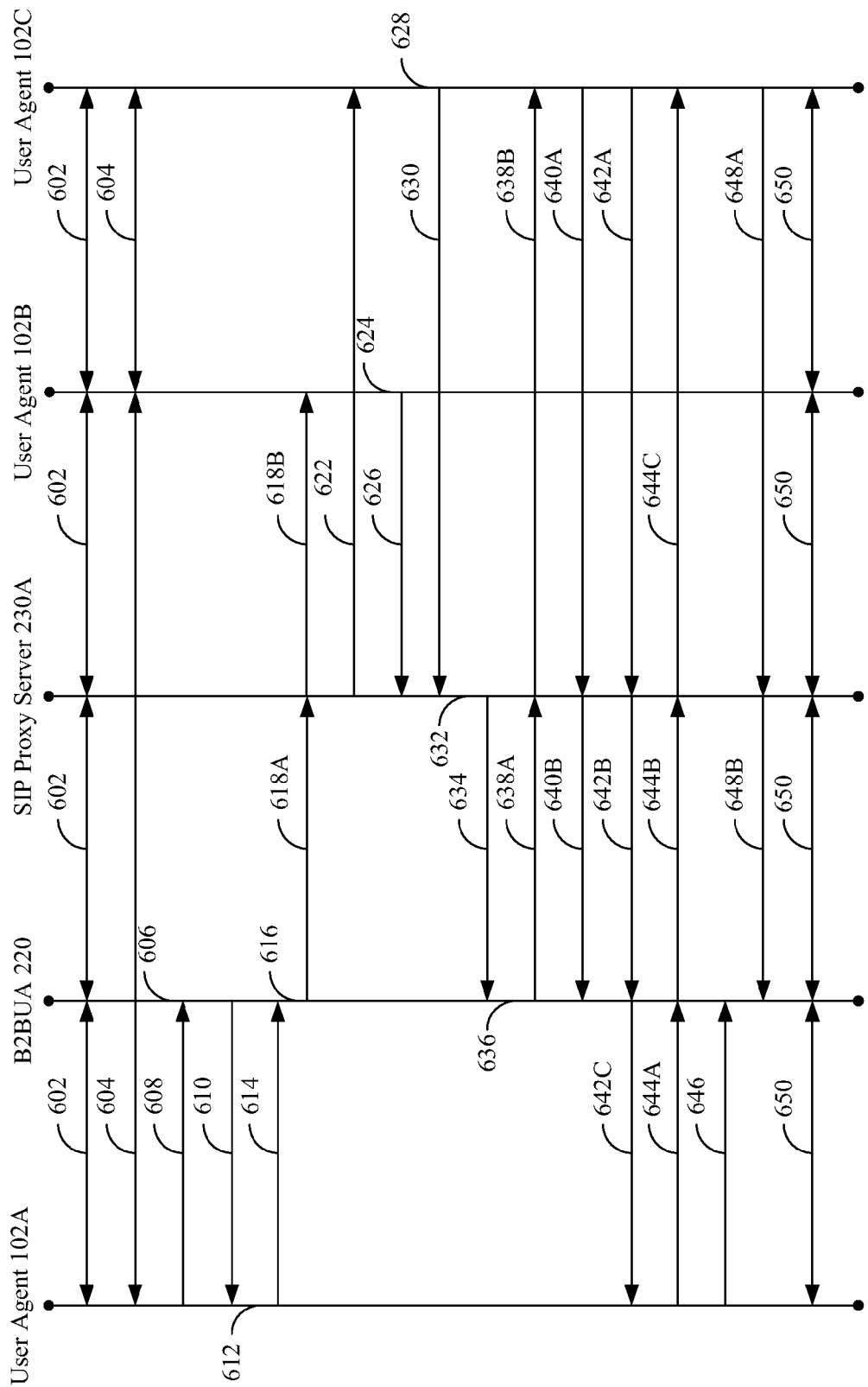
FIG. 6 is a flow diagram of a method for reconstructing a Session Initiation Protocol (SIP dialog setup with a Back-to-Back User Agent (B2BUA).

FIG. 6 is a flow diagram of a method for reconstructing a Session Initiation Protocol (SIP dialog setup with a Back-to-Back User Agent (B2BUA). The SIP proxy server 230A, in conjunction with B2BUA 220, is configured to establish 602 a SIP session dialog between the user agents 102A-102C using standard SIP processes. In this example, the SIP signaling that is sent to user agent 102B is also forked to user agent 102C. Forking is used to allow a second communication device 101C to, for example, to ring at the same time as when a call is received at communication device 101B. In other examples, this may be a conference call.

Once the SIP session dialog between user agents 102A-102C is established 602, a media session can be directly established 604 between the user agents 102A-102C. In this illustrative embodiment, the media stream is not sent through the SIP Proxy server 230A or the B2BUA 220. The B2BUA 220, while the media stream is still active, may at some point, may no longer be aware 606 of the SIP session dialog between the user agents 102A-102C. After this, the SIP module 221 in the B2BUA 220 receives 608, from the user agent 102A, an in-dialog message for the SIP session dialog between the user agents 102A-102C. In response to receiving the in-dialog message for the SIP session dialog between the user agents 102A-102C, the SIP module 221 in the B2BUA 220 sends 610 a request not found message to the user agent 102A. The request not found message also comprises a server accessible value generated by timer module 222.

The user agent 102A receives the request not found message with the server accessible value. The user agent 102A previously stored a time associated with the establishment of the SIP dialog between the user agent 102A and the B2BUA 220. The user agent 102A compares 612 the time associated with the establishment of the SIP session dialog to the server accessible value. If the server accessible value is after the time associated with the establishment of the SIP session dialog, the user agent 102A sends 614 an out-of-dialog SIP REFER message to the SIP module 221 in the B2BUA 220. The out-of-dialog SIP REFER message comprises call state information for the SIP dialog between the user agent 102A and the B2BUA 220.

The SIP module 221 in the B2BUA 220 looks 616 at the call state information in the SIP REFER message and invokes a procedure for reestablishing the SIP session dialog between user agents 102A-102C by getting call state information from user agents 102B and 102C. The SIP module 221 in the B2BUA 220 sends 618A a SIP OPTIONS query message to the SIP proxy server 230B. The SIP proxy server 230B sends 618B the SIP OPTIONS query message to the user agent 102B. In addition, since the previous SIP dialog was forked, the SIP proxy server 230B also sends 622 the SIP OPTIONS message to the user agent 102C.

The user agent 102B responds 624 to the SIP OPTIONS query message by sending 626 a 200 OK message that includes information on any active calls that the user agent 102B currently has to the SIP proxy server 230B. Since there is an active call for the SIP dialog between the user agent 102B and the B2BUA 220, the call state information for the SIP dialog between the user agent 102B and the B2BUA 220 will be included in the 200 OK message. Likewise, the user agent 102C responds 628 by sending 630 a similar 200 OK message to the SIP proxy server 230B. A 200 OK message with call state information (a Globally Routable Unique URI (GRUU)) for the SIP dialogs between the user agents 102B/102C and the B2BUA 220 is sent 634 from the SIP proxy server 230A to the SIP module 221 in the B2BUA 220.

The SIP module 221 in the B2BUA 220 compares 636 the call state information in the 200 OK messages sent from the user agent 102B and the user agent 102C with the call state information in the SIP REFER message received from the user agent 102A. The SIP module 221 can determine if the call state information matches because the SIP module knows that the SIP dialog between the user agent 102A and the B2BUA 220 and the SIP dialogs between the user agents 102B-102C and the B2BUA 220 are part of the SIP session dialog between the user agents 102A-102C. If the call state information matches, the SIP module 221 in the B2BUA 220 sends 638A an out-of-dialog REFER message to the SIP proxy server 230B. The SIP proxy server 230B sends 638B the out-of-dialog REFER message to the user agent 102C because the GRUU is for the user agent 102C.

The user agent 102C receives the out-of-dialog SIP REFER message from the SIP proxy server 230B. In response to receiving the out-of-dialog SIP REFER message, the user agent 102C sends 640A a SIP 202 accepted response message for the SIP REFER message to the SIP proxy server 230B. The SIP proxy server 230B sends 640B the 202 accepted response message to the SIP module 221 in the B2BUA 220.

Also, in response to receiving the out-of-dialog SIP REFER message, the user agent 102C sends 642A a SIP INVITE with replaces header to the SIP proxy server 230B. The SIP INVITE with replaces header contains the necessary URIs from the out-of-dialog SIP REFER message to reestablish the SIP session dialog between the user agent 102A and the user agent 102C and 102B. The SIP proxy server 230B sends 642B the SIP INVITE with the replaces header to the SIP module 221 in the B2BUA 220. The SIP module 221 in the B2BUA 220 sends 642C the SIP INVITE with the replaces header to the user agent 102A. The user agent 102A sends 644A a 200 OK in response to the SIP INVITE with the replaces header to the SIP module 221 in the B2BUA 220, which in turns sends 644B the 200 OK to the SIP proxy server 230A. The SIP proxy server 230A sends 644C the 200 OK to the user agent 102B.

The user agent 102A sends 646 a SIP BYE message for the original SIP dialog between the user agent 102A and the B2BUA 220 to the SIP module 221. Likewise, the user agent 102C sends 648A a SIP BYE message for the original SIP dialog between the user agent 102C and the B2BUA 220 to the SIP proxy server 230A, which in turn sends 648B the SIP BYE message for the original for the original SIP dialog between the user agent 102C and the B2BUA 220 to the SIP module 221. At this point, the session dialog between the user agent 102A and the user agent 102B is reestablished 650 and normal SIP call processing can ensue.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   a processor enabled SIP server establishing a Session Initiation Protocol (SIP) session dialog, between a first user agent and a second user agent;
   while the processor enabled SIP server is no longer aware of the SIP session dialog, the processor enabled SIP server receiving, from the first user agent, an in-dialog message for the SIP session dialog between the first user agent and the second user agent;
   in response to receiving the in-dialog message for the SIP session dialog between the first user agent and the second user agent, the processor enabled SIP server sending a request not found message to the first user agent, wherein the request not found message comprises a server accessible value;
   the processor enabled SIP server receiving, from the first user agent, an out-of-dialog SIP REFER message for the second user agent, wherein the out-of-dialog SIP REFER message comprises call state information for the SIP session dialog between the first user agent and the second user agent and wherein the out-of-dialog SIP REFER message is sent based on the server accessible value;
   sending, from the processor enabled SIP server, the out-of-dialog SIP REFER message to the second user agent; and
   reestablishing the SIP session dialog between the first user agent and the second user agent.

2. The method of claim 1, wherein the SIP server is a SIP proxy server, the method further comprising establishing a media session directly between the first user agent and the second user agent.

3. The method of claim 1, wherein the SIP server is a Back-to-Back User Agent (B2BUA), the method further comprising:
   sending from the B2BUA to the second user agent, a SIP OPTIONS query message comprising a request for call-state information for a SIP dialog between the B2BUA and second user agent; and
   in response to the SIP OPTIONS query message, receiving from the second user agent a 200 OK message that includes the call state information for the SIP dialog between the B2BUA and the second user agent.

4. The method of claim 3, wherein reestablishing the SIP session dialog between the first user agent and the second user agent comprises reestablishing the SIP dialog between the B2BUA and the second user agent and reestablishing a SIP dialog between the B2BUA and the first user agent.

5. The method of claim 3, wherein the second user agent sends the 200 OK message that includes the call state information for the SIP dialog between the B2BUA and the second user agent if a match among active calls is found in the second user agent.

6. The method of claim 3, wherein the call state information for the SIP dialog between the B2BUA and the second user agent comprises a session ID for the SIP session dialog between the first user agent and the second user agent and wherein the B2BUA uses the session ID for the SIP session dialog between the first user agent and the second user agent to reestablish the SIP session dialog between the first user agent and the second user agent.

7. The method of claim 3, wherein the call state information for the SIP dialog between the B2BUA and the second user agent does not include a session ID for the SIP session dialog between the first user agent and the second user agent, wherein the call state information for the SIP dialog between the B2BUA and the second user agent comprises a To field and a From field, and wherein the To field and the From field are used to reestablish the SIP session dialog between the first user agent and the second user agent.

8. The method of claim 3, wherein the B2BUA compares the call state information in the 200 OK message to the call state information in the out-of-dialog SIP REFER message, wherein in response to the call state information in the 200 OK message matching the call state information in the outof-dialog SIP REFER message, sending the out-of-dialog SIP REFER message to the second user agent.

9. The method of claim 3, wherein the call state information for the SIP session dialog between the first user agent and the second user agent comprises call state information for a SIP dialog between the B2BUA and the first user agent.

10. The method of claim 1, further comprising the step of the first user agent storing a time associated with the establishment of the SIP session dialog between the first user agent and the second user agent, wherein the first user agent sends the out-of-dialog SIP REFER message based on the server accessible value being after the time associated with the establishment of the SIP session dialog between the first user agent and the second user agent and wherein the server accessible value is at least one of:
- an indication of how long the SIP server has been running;
- a time since the SIP server failed over;
- a time since the SIP module in the SIP server was restarted on another processor or container in the SIP server 120; and
- a time since the SIP session dialog between the first user agent and the second user agent timed out.

11. A system comprising:
a Session Initiation Protocol (SIP) server comprising:
a microprocessor; and
a computer memory including instructions that are executable by the microprocessor, the instructions including a SIP module wherein the microprocessor, when executing the SIP module:
establishes a SIP session dialog between a first user agent and a second user agent,
receive from the first user agent, an in-dialog message for the SIP session dialog between the first user agent and the second user agent, wherein the SIP server is no longer aware of the SIP session dialog,
in response to receiving the in-dialog message for the SIP session dialog between the first user agent and the second user agent while the SIP server is no aware of the SIP session dialog, sends a request not found message to the first user agent, wherein the request not found message comprises a server accessible value,
receives from the first user agent an out-of-dialog SIP REFER message for the second user agent, wherein the out-of-dialog SIP REFER message comprises call state information for the SIP session dialog between the first user agent and the second user agent and the out-of-dialog SIP REFER message is sent based on the server accessible value,
sends the out-of-dialog SIP REFER message to the second user agent, and
reestablishes the SIP session dialog between the first user agent and the second user agent; and
a timer module that generates the server accessible value.

12. The system of claim 11, wherein the SIP server is a SIP proxy server and the SIP module is further configured to establish a media session directly between the first user agent and the second user agent.

13. The system of claim 11, wherein the SIP server is a Back-to-Back User Agent (B2BUA) and the SIP module is further configured to:
send to the second user agent a SIP OPTIONS query message comprising a request for call-state information for a SIP dialog between the B2BUA and second user agent, and
in response to the SIP OPTIONS query message, receive from the second user agent a 200 OK message that includes the call state information for the SIP dialog between the B2BUA and the second user agent.

14. The system of claim 13, wherein reestablishing the SIP session dialog between the first user agent and the second user agent comprises reestablishing the SIP dialog between the B2BUA and the second user agent and reestablishing a SIP dialog between the B2BUA and the first user agent.

15. The system of claim 13, wherein the second user agent sends the 200 OK message that includes the call state information for the SIP dialog between the B2BUA and the second user agent if a match among active calls is found in the second user agent.

16. The system of claim 13, wherein the call state information for the SIP dialog between the B2BUA and the second user agent comprises a session ID for the SIP session dialog between the first user agent and the second user agent and wherein the B2BUA uses the session ID for the SIP session dialog between the first user agent and the second user agent to reestablish the SIP session dialog between the first user agent and the second user agent.

17. The system of claim 13, wherein the call state information for the SIP dialog between the B2BUA and the second user agent does not include a session ID for the SIP session dialog between the first user agent and the second user agent, wherein the call state information for the SIP dialog between the B2BUA and the second user agent comprises a To field and a From field, and wherein the To field and the From field are used to reestablish the SIP session dialog between the first user agent and the second user agent.

18. The system of claim 13, wherein the B2BUA compares the call state information in the 200 OK message to the call state information in the out-of-dialog SIP REFER message, wherein in response to the call state information in the 200 OK message matching the call state information in the out-of-dialog SIP REFER message, sending, the out-of-dialog SIP REFER message to the second user agent.

19. The system of claim 11, wherein the SIP module is further configured to store a time associated with the establishment of the SIP session dialog between the first user agent and the second user agent, wherein the first user agent sends the out-of-dialog SIP REFER message based on the server accessible value being after the time associated with the establishment of the SIP session dialog between the first user agent and the second user agent and wherein the server accessible value is at least one of:
- an indication of how long the SIP server has been running;
- a time since the SIP server failed over;
- a time since the SIP module in the SIP server was restarted on another processor or container in the SIP server 120; and
- a time since the SIP session dialog between the first user agent and the second user agent timed out.

20. A non-transitory computer readable medium having stored thereon instructions that cause a microprocessor to execute a method, the method comprising:
instructions to establish a Session Initiation Protocol (SIP) dialog between a first user agent and a second user agent;
instructions to receive from the first user agent, an in-dialog message for the SIP session dialog between the first user agent and the second user agent, wherein the SIP server is no longer aware of the SIP session dialog;
in response to receiving the in-dialog message for the SIP session dialog between the first user agent and the second user agent, instructions to send a request not found message to the first user agent, wherein the request not found message comprises a server accessible value;

instructions to receive from the first user agent an out-of-dialog SIP REFER message for the second user agent, wherein the out-of-dialog SIP REFER message comprises call state information for the SIP session dialog between the first user agent and the second user agent and the out-of-dialog SIP REFER message is sent based on the server accessible value;

instructions to send the out-of-dialog SIP REFER message to the second user agent; and instructions to reestablish the SIP session dialog between the first user agent and the second user agent.

* * * * *